(12) United States Patent
Sasaki et al.

(10) Patent No.: US 6,577,475 B1
(45) Date of Patent: Jun. 10, 2003

(54) THIN-FILM MAGNETIC HEAD HAVING REDUCED YOKE LENGTH AND METHOD OF MANUFACTURING SAME

(75) Inventors: Yoshitaka Sasaki, Tokyo (JP); Atsushi Iijima, Tokyo (JP); Nobuya Oyama, Tokyo (JP); Noboru Yamanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 60 days.

(21) Appl. No.: 09/612,620

(22) Filed: Jul. 6, 2000

(30) Foreign Application Priority Data

Jul. 16, 1999  (JP) ............................................. 11-202456

(51) Int. Cl.[7] ................................................. G11B 5/127
(52) U.S. Cl. ....................... 360/317; 360/126; 29/603.14
(58) Field of Search ................................ 360/317, 318, 360/126; 29/603.14, 603.15

(56) References Cited

U.S. PATENT DOCUMENTS

| | | | | |
|---|---|---|---|---|
| 5,438,747 A | | 8/1995 | Krounbi et al. | .......... 29/603.16 |
| 5,949,625 A | * | 9/1999 | Sato et al. | ................... 360/120 |
| 6,034,848 A | * | 3/2000 | Garfunkel et al. | .......... 360/126 |
| 6,055,137 A | * | 4/2000 | Ishiwata et al. | ............ 360/126 |
| 6,158,107 A | * | 12/2000 | Chang et al. | ............. 29/603.07 |
| 6,163,442 A | * | 12/2000 | Gill et al. | .................... 360/126 |
| 6,178,070 B1 | * | 1/2001 | Hong et al. | .................. 360/119 |
| 6,275,360 B1 | * | 8/2001 | Nakamoto et al. | .......... 360/317 |
| 6,301,085 B1 | * | 10/2001 | Sato | ............................. 360/317 |
| 6,353,995 B1 | * | 3/2002 | Sasaki et al. | ............. 29/603.14 |

FOREIGN PATENT DOCUMENTS

| | | |
|---|---|---|
| JP | A-60-10409 | 1/1985 |
| JP | A-62-245509 | 10/1987 |
| JP | A-7-262519 | 10/1995 |

\* cited by examiner

*Primary Examiner*—Hoa T. Nguyen
*Assistant Examiner*—Tianjie Chen
(74) *Attorney, Agent, or Firm*—Oliff & Berridge, PLC

(57) ABSTRACT

A recording head has a bottom pole layer and a top pole layer that include pole portions, and a recording gap layer placed between the pole portions. The recording head further has a thin-film coil placed between the bottom and top pole layers, the coil being insulated from the pole layers. The bottom pole layer includes a first layer and a second layer. The first layer is located in a region facing toward the thin-film coil, an insulating layer being placed between the first layer and the coil. The second layer is connected to a surface of the first layer facing toward the thin-film coil. The second layer includes the pole portion and defines a throat height. The thin-film coil is located on a side of the second layer. The first layer has a width that decreases as the distance from an air bearing surface decreases.

24 Claims, 12 Drawing Sheets

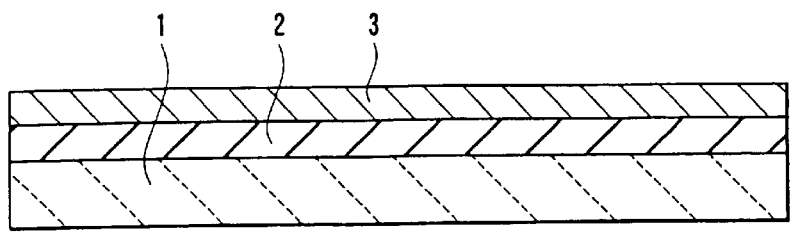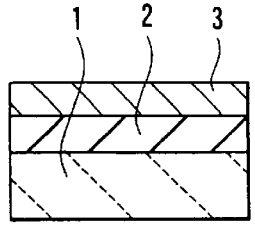
FIG. 1A   FIG. 1B
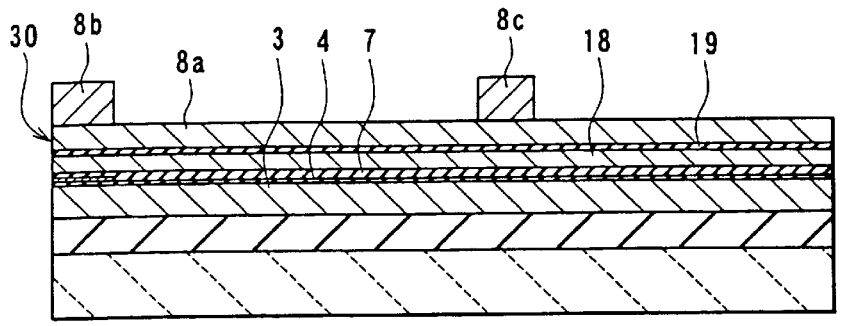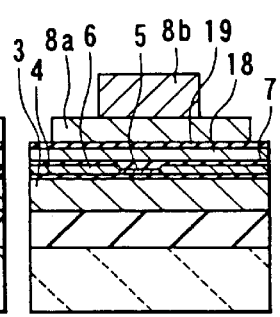
FIG. 2A   FIG. 2B
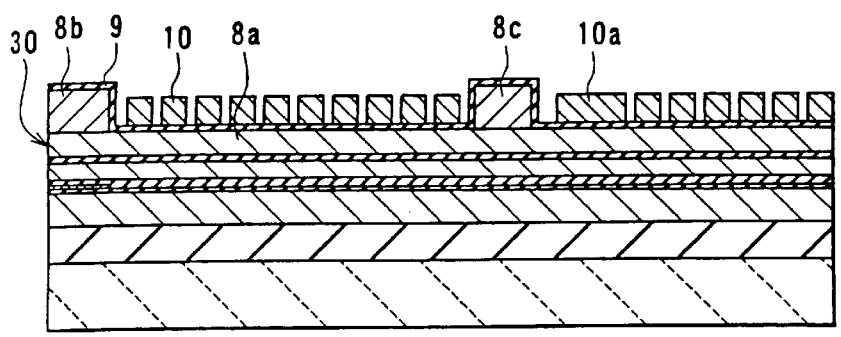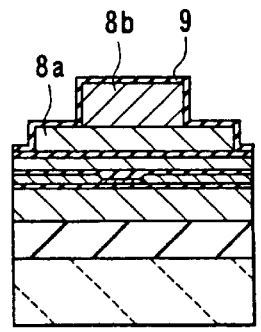
FIG. 3A   FIG. 3B

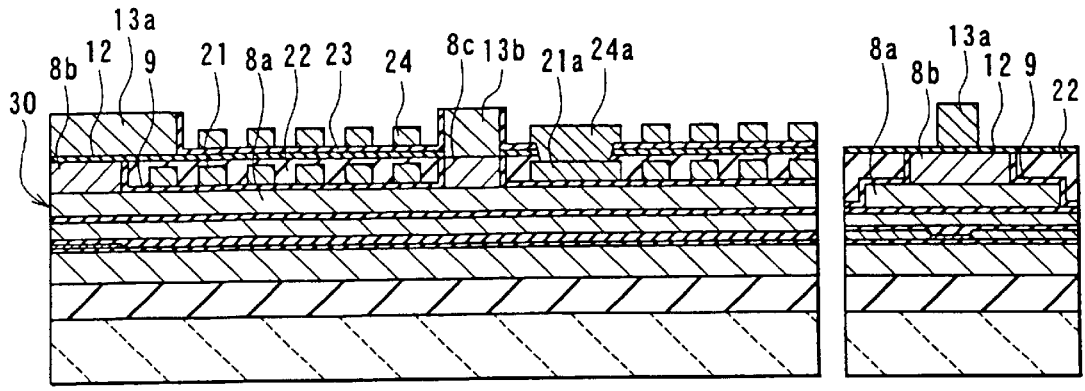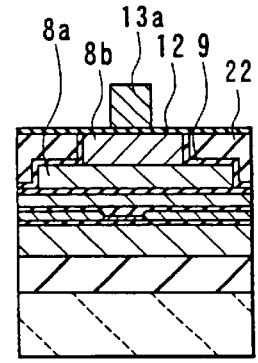
FIG. 12A  FIG. 12B
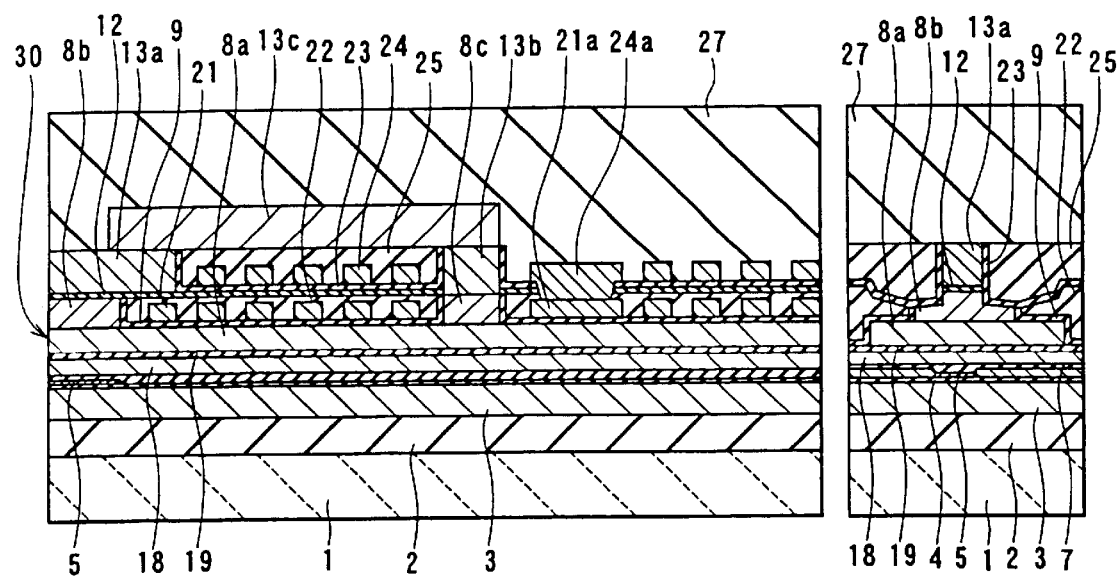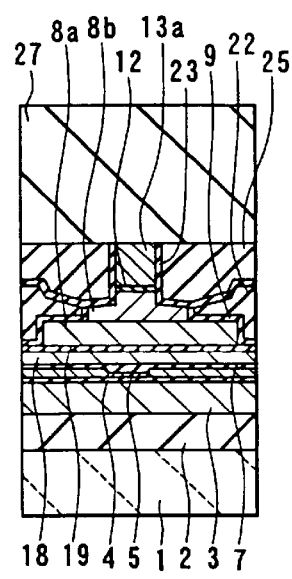
FIG. 13A  FIG. 13B

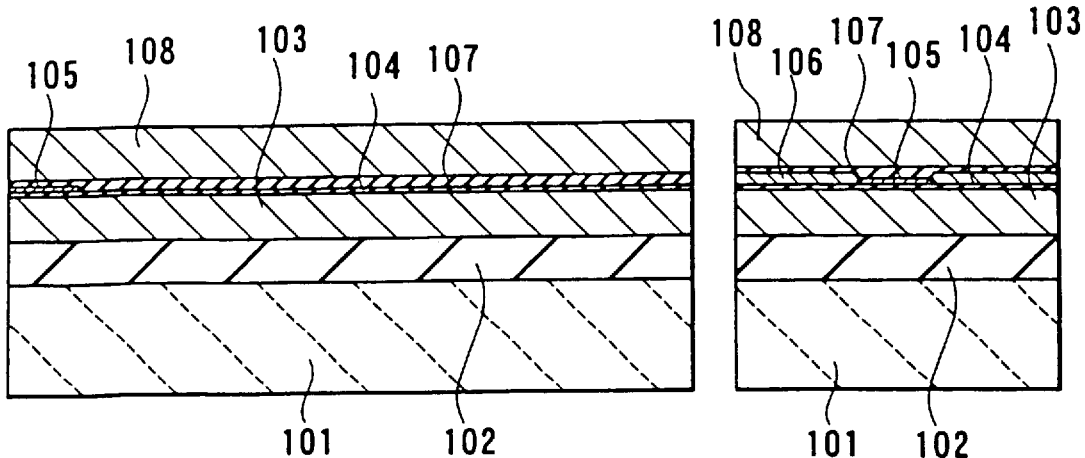
FIG. 15A
RELATED ART
FIG. 15B
RELATED ART
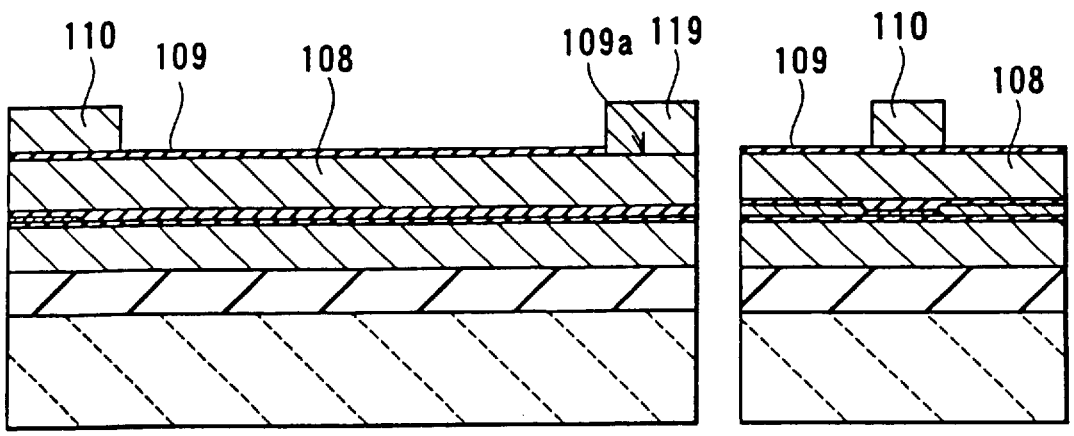
FIG. 16A
RELATED ART
FIG. 16B
RELATED ART

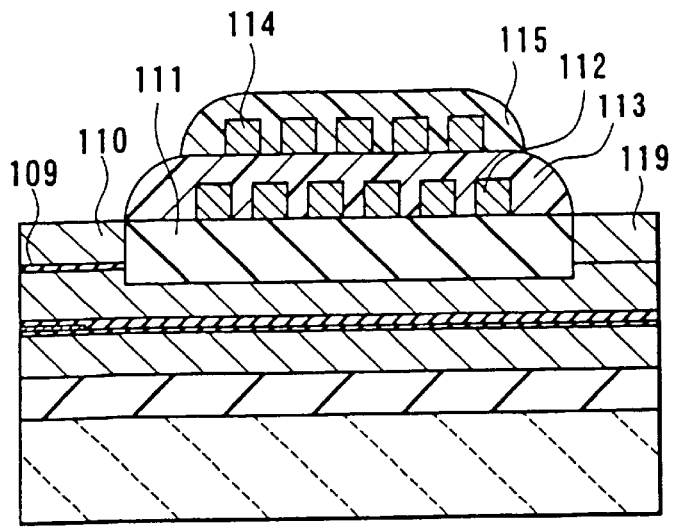
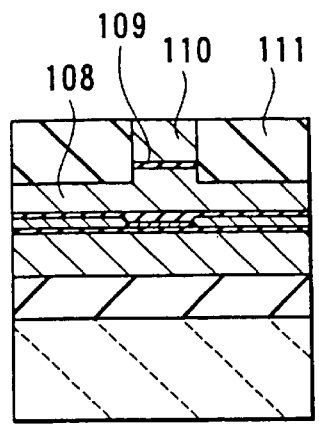
FIG. 17A
RELATED ART
FIG. 17B
RELATED ART
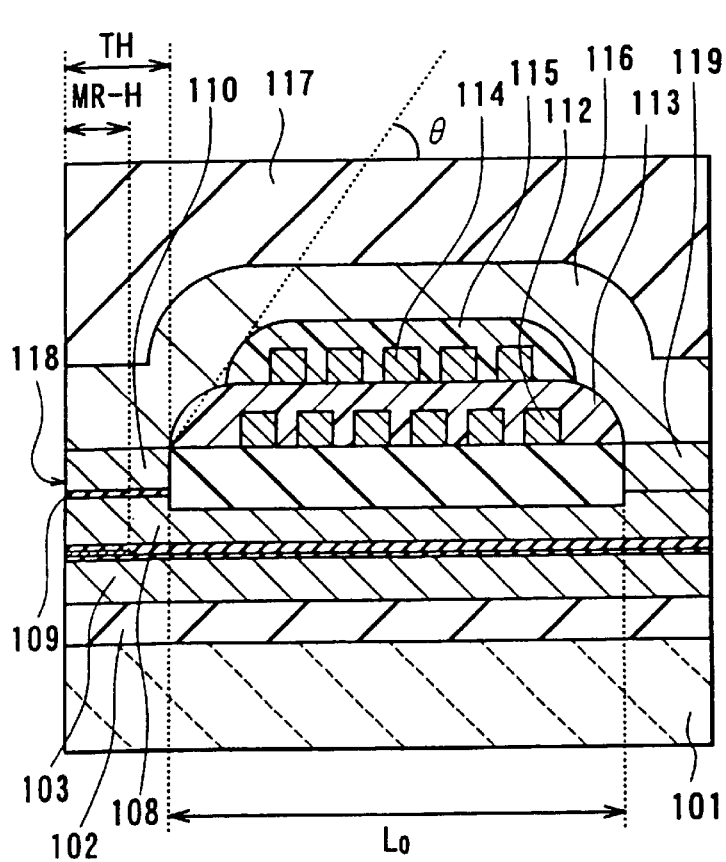
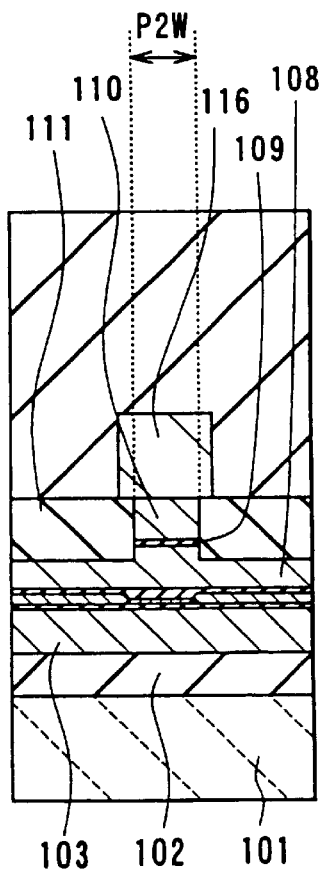
FIG. 18A
RELATED ART
FIG. 18B
RELATED ART

THIN-FILM MAGNETIC HEAD HAVING REDUCED YOKE LENGTH AND METHOD OF MANUFACTURING SAME

BACKGROUND OF THE INVENTION

1. Field of the Invention

The present invention relates to a thin-film magnetic head having at least an induction-type magnetic transducer and to a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein a track width, that is, the width of top and bottom poles sandwiching the recording gap layer on a side of the air bearing surface, is reduced down to microns or the submicron order. Semiconductor process techniques are utilized to implement such a structure.

Reference is now made to FIG. 15A to FIG. 18A and FIG. 15B to FIG. 18B to describe an example of a method of manufacturing a composite thin-film magnetic head as an example of a related-art method of manufacturing a thin-film magnetic head. FIG. 15A to FIG. 18A are cross sections each orthogonal to an air bearing surface of the thin-film magnetic head. FIG. 15B to FIG. 18B are cross sections of a pole portion of the head each parallel to the air bearing surface.

In the manufacturing method, as shown in FIG. 15A and FIG. 15B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum--bottom-pole-layer (called a bottom pole layer in the following description) 108 having a thickness of about 3 $\mu$m is formed. The bottom pole layer 108 is made of a magnetic material and used for both a reproducing head and a recording head.

Next, as shown in FIG. 16A and FIG. 16B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 17A and FIG. 17B, the recording gap layer 109 and the bottom pole layer 108 are etched through ion milling, using the top pole tip 110 as a mask. As shown in FIG. 17B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 18A and FIG. 18B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, lapping of the slider is performed to form the air bearing surface 118 of the thin-film magnetic head including the recording head and the reproducing head. The thin-film magnetic head is thus completed.

FIG. 19 is a top view of the thin-film magnetic head shown in FIG. 18A and FIG. 18B. The overcoat layer 117 and the other insulating layers and insulating films are omitted in FIG. 19.

In FIG. 18A, 'TH' indicates the throat height and 'MR-H' indicates the MR height. The throat height is the length (height) of pole portions, that is, portions of magnetic pole layers facing each other with a recording gap layer in between, between the air-bearing-surface-side end and the other end. The MR height is the length (height) between the air-bearing-surface-side end of the MR element and the other end. In FIG. 18B, 'P2W' indicates the pole width, that is, the track width of the recording head (hereinafter called the recording track width). In addition to the throat height, the MR height and so on, the apex angle as indicated with θ in FIG. 18A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and recording track width P2W as shown in FIG. 18A and FIG. 18B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer of small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

As thus described, it is difficult in prior art to fabricate the top pole-layer with accuracy if the pole width of the submicron order is required.

To overcome the problems thus described, a method has been taken, as shown in the foregoing related-art manufacturing steps illustrated in FIG. 16A to FIG. 18A and FIG. 16B to FIG. 18B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the recording track width is formed into small dimensions to some degree on the flat top surface of the recording gap layer 109.

However, the following problems are still found in the thin-film magnetic head having a structure as shown in FIG. 18A and FIG. 18B.

In the thin-film magnetic head shown in FIG. 18A and FIG. 18B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicron-order width is required for the top pole layer 116, too. However, the top pole layer 116 is formed on top of the apex in the head shown in FIG. 18A and FIG. 18B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is made two-layer or three-layer to improve the performance of the recording head, and the apex is thereby increased in height, compared to the case where the coil is one-layer.

In the thin-film magnetic head shown in FIG. 18A and FIG. 18B, the recording track width and the throat height are defined by the top pole tip 110. Therefore, if the recording track width is extremely reduced, that is, down to 0.5 μm or less, in particular, the size of the top pole tip 110 is thus extremely reduced. As a result, pattern edges may be rounded and it is difficult to form the top pole tip 110 with accuracy. Therefore, the thin-film magnetic head having the structure as shown in FIG. 18A and FIG. 18B has a problem that it is difficult to precisely control the recording track width if the recording track width is extremely reduced.

Furthermore, in a prior-art magnetic head, it is difficult to reduce the magnetic path (yoke) length. That is, if the coil pitch is reduced, a head with a reduced yoke length is achieved and a recording head having an excellent high frequency characteristic and an excellent nonlinear transition shift (NLTS) characteristic is achieved, in particular. However, if the coil pitch is reduced to the limit, the distance between the zero throat height position (the position of an end of the pole portion opposite to the air bearing surface) and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 μm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 μm, the thickness of the insulating film between the layers of the coil is 2 μm, and the apex angle is 45 to 55 degrees, for example, the yoke length is required to be 6 to 8 μm which is twice as long as the distance between the outermost end of the coil and the neighborhood of the zero throat height position, that is, 3 to 4 μm (the distance between the innermost end of the coil and the portion where the top and bottom pole layers are in contact with each other is required to be 3 to 4 µm, too), in addition to the length of the portion corresponding to the coil. This length of the portion other than the portion corresponding to the coil is one of the factors that prevent a reduction in the yoke length.

Assuming that a two-layer eleven-turn coil in which the line width is 1.5 µm and the space is 0.5 µm is fabricated, for example, the portion of the yoke length corresponding to the first layer 112 of the coil is 11.5 µm, if the first layer is made up of six turns and the second layer is made up of five turns, as shown in FIG. 18A and FIG. 18B. In addition to this length, the total of 6 to 8 µm, that is, the distance between each of the outermost and innermost ends of the first layer 112 of the coil and each of ends of the photoresist layer 113 for insulating the first layer 112, is required for the yoke length. Therefore, the yoke length is 17.5 to 19.5 µm. In the present patent application, the yoke length is the length of a portion of the pole layer except the pole portion and the contact portions, as indicated with Lo in FIG. 18A. As thus described, it is difficult in the prior art to further reduce the yoke length, which prevents improvements in high frequency characteristic and NLTS.

OBJECT AND SUMMARY OF THE INVENTION

It is an object of the invention to provide a thin-film magnetic head and a method of manufacturing the same for achieving reductions in track width and yoke length of an induction-type magnetic transducer.

A thin-film magnetic head of the invention comprises: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. One of the magnetic layers includes: a first layer located in a region facing toward the at least part of the thin-film coil, the first layer having a width that decreases as a distance from the medium facing surface decreases; and a second layer connected to a surface of the first layer facing toward the thin-film coil, the second layer including one of the pole portions and defining a throat height. The at least part of the thin-film coil is located on a side of the second layer. The other of the magnetic layers includes a portion that defines a track width.

A method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers.

The method of the invention includes the steps of: forming the first magnetic layer; forming the gap layer on the first magnetic layer; forming the second magnetic layer on the gap layer; and forming the thin-film coil such that the at least part of the coil is placed between the first and second magnetic layers, the at least part of the coil being insulated from the first and second magnetic layers. The step of forming one of the magnetic layers includes the steps of: forming a first layer located in a region facing toward the at least part of the thin-film coil, the first layer having a width that decreases as a distance from the medium facing surface decreases; and forming a second layer connected to a surface of the first layer facing toward the thin-film coil, the second layer including one of the pole portions and defining a throat height. The at least part of the thin-film coil is located on a side of the second layer in the step of forming the coil. A portion that defines a track width is formed in the step of forming the other of the magnetic layers.

According to the thin-film magnetic head or the method of manufacturing the same of the invention, the throat height is defined by the second layer of one of the magnetic layers. The track width is defined by the other of the magnetic layers. In the invention at least a part of the thin-film coil is located on a side of the second layer. As a result, it is possible that the other of the magnetic layers that defines the track width is formed on the flat surface with accuracy. According to the invention, it is possible that an end of at least a part of the thin-film coil is located near an end of the second layer. A reduction in yoke length is thereby achieved.

According to the thin-film magnetic head or the method of manufacturing the same of the invention, the width of the second layer measured in the medium facing surface may decrease as the distance from the gap layer decreases. In this case, the second layer may include a portion that is closest to the gap layer and has a width equal to the track width.

According to the head or the method of the invention, the width of the second layer measured in the medium facing surface may be smaller than the width of the first layer measured in the medium facing surface.

According to the head or the method of the invention, an insulating layer may be further provided. The insulating layer covers the at least part of the thin-film coil located on the side of the second layer, and has a surface facing toward the gap layer, the surface being flattened together with a surface of the second layer facing toward the gap layer.

According to the head or the method of the invention, the other of the magnetic layers may be made up of one layer.

According to the head or the method of the invention, the other of the magnetic layers may include: a pole portion layer including the other of the pole portions; and a yoke portion layer forming a yoke portion and connected to the pole portion layer. In this case, an end face of the yoke portion layer facing toward the medium facing surface may be located at a distance from the medium facing surface. The thin-film coil may include: a first layer portion located on a side of the second layer of the one of the magnetic layers; and a second layer portion located on a side of the pole portion layer of the other of the magnetic layers. In this case, first and second insulating layers may be further provided. The first insulating layer covers the first layer portion of the coil and has a surface facing toward the gap layer, the surface being flattened together with a surface of the second layer facing toward the gap layer. The second insulating layer covers the second layer portion of the coil and has a surface facing toward the yoke portion layer, the surface being flattened together with a surface of the pole portion layer facing toward the yoke portion layer.

According to the head or the method of the invention, a magnetoresistive element, and first and second shield layers for shielding the magnetoresistive element may be further provided. Portions of the first and second shield layers located in regions on a side of the medium facing surface are opposed to each other, the magnetoresistive element being placed between the portions of the shield layers. In this case, the first layer may be adjacent to the first or second shield layer while the first layer is separated from the first or second shield layer.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 12A and FIG. 12B are cross sections for illustrating a step that follows FIG. 11A and FIG. 11B.

FIG. 13A and FIG. 13B are cross sections of the thin-film magnetic head of the second embodiment.

FIG. 15A and FIG. 15B are cross sections for illustrating a step in a method of manufacturing a thin-film magnetic head of related art.

FIG. 16A and FIG. 16B are cross sections for illustrating a step that follows FIG. 15A and FIG. 15B.

FIG. 17A and FIG. 17B are cross sections for illustrating a step that follows FIG. 16A and FIG. 16B.

FIG. 18A and FIG. 18B are cross sections for illustrating a step that follows FIG. 17A and FIG. 17B.

DETAILED DESCRIPTION OF THE PREFERRED EMBODIMENTS

Figures 4A, 4B:
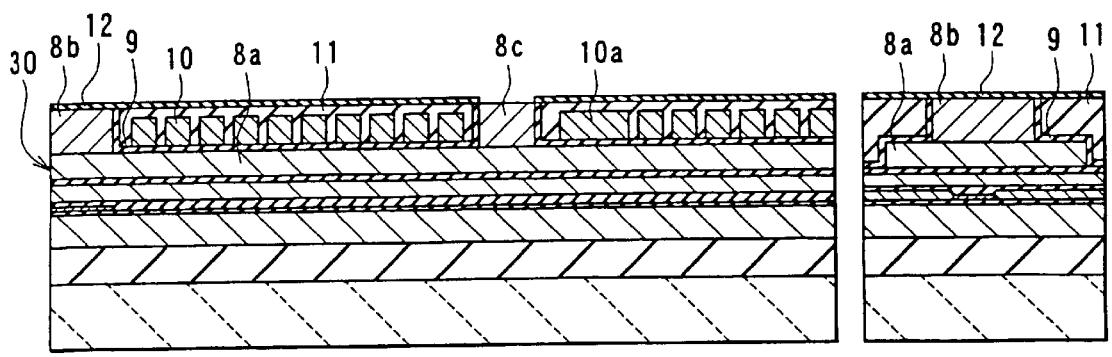
FIG. 4A and FIG. 4B are cross sections for illustrating a step that follows FIG. 3A and FIG. 3B.

Preferred embodiments of the invention will now be described in detail with reference to the accompanying drawings.

[First Embodiment]

Reference is now made to FIG. 1A to FIG. 6A, FIG. 1B to FIG. 6B, and FIG. 7 to FIG. 9 to describe a thin-film magnetic head and a method of manufacturing the same of a first embodiment of the invention. FIG. 1A to FIG. 6A are cross sections each orthogonal to an air bearing surface. FIG. 1B to FIG. 6B are cross sections of the pole portion each parallel to the air bearing surface.

In the manufacturing method, as shown in FIG. 1A and FIG. 1B, an insulating layer 2 made of alumina ($Al_2O_3$), for example, whose thicknesses about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of about 4 to 5 $\mu$m is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are formed through CVD, materials used are trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a top shield layer 18 made of a magnetic material such as Permalloy and having a thickness of about 1.0 to 2.0 $\mu$m is formed for the reproducing head. The top shield layer 18 may be selectively formed on the top shield gap film 7 through plating with a photoresist film as a mask.

Next, an insulating film 19 of alumina, for example, having a thickness of about 50 to 200 nm, for example, is formed for magnetically insulating the reproducing head from the recording head.

Next, a first layer 8a of a bottom pole layer 8 having a thickness of about 1.0 to 1.5 $\mu$m is selectively formed. The bottom pole layer 8 is made of a magnetic material and used for the recording head. The bottom pole layer 8 is made up of a second layer 8b and a third layer 8c described later, in addition to the first layer 8a. The first layer 8a is placed in a region facing toward at least a part of a thin-film coil described later.

Next, although not shown in FIG. 2A and FIG. 2B, an insulating layer of alumina, for example, having a thickness of about 2 to 3 μm may be formed over the entire surface. This insulating layer may be polished through CMP, or example, until the first layer 8a of the bottom pole layer 8 is exposed, and the surface may be flattened.

Next, the second layer 8b and the third layer 8c of the bottom pole layer 8, each having a thickness of about 1.5 to 2.5 μm, are formed on the first layer 8a. A portion of the second layer 8b makes up a pole portion of the bottom pole layer 8 and is connected to a surface of the first layer 8a that faces toward the thin-film coil (on the upper side of the drawings). The third layer 8c is provided for connecting the first layer 8a to a top pole layer described later. The throat height is defined by the position of an end of the second layer 8b opposite to the air bearing surface 30. This position is the zero throat height position. The throat height is nearly equal to the MR height in this embodiment.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 3A and FIG. 3B, an insulating film 9 of alumina, for example, is formed over the entire surface. The thickness of the insulating film 9 is about 0.3 to 0.6 μm.

Next, a photoresist is patterned through a photolithography process to form a frame (not shown) for making the thin-film coil through frame plating. Next, the thin-film coil 10 made of copper (Cu), for example, is formed by frame plating through the use of this frame. For example, the thickness of the coil 10 is about 1.0 to 2.0 μm and the pitch is 1.2 to 2.0 μm. The frame is then removed. In the drawings numeral 10a indicates a portion for connecting the thin-film coil 10 to a conductive layer (lead) described later.

Figure 8:
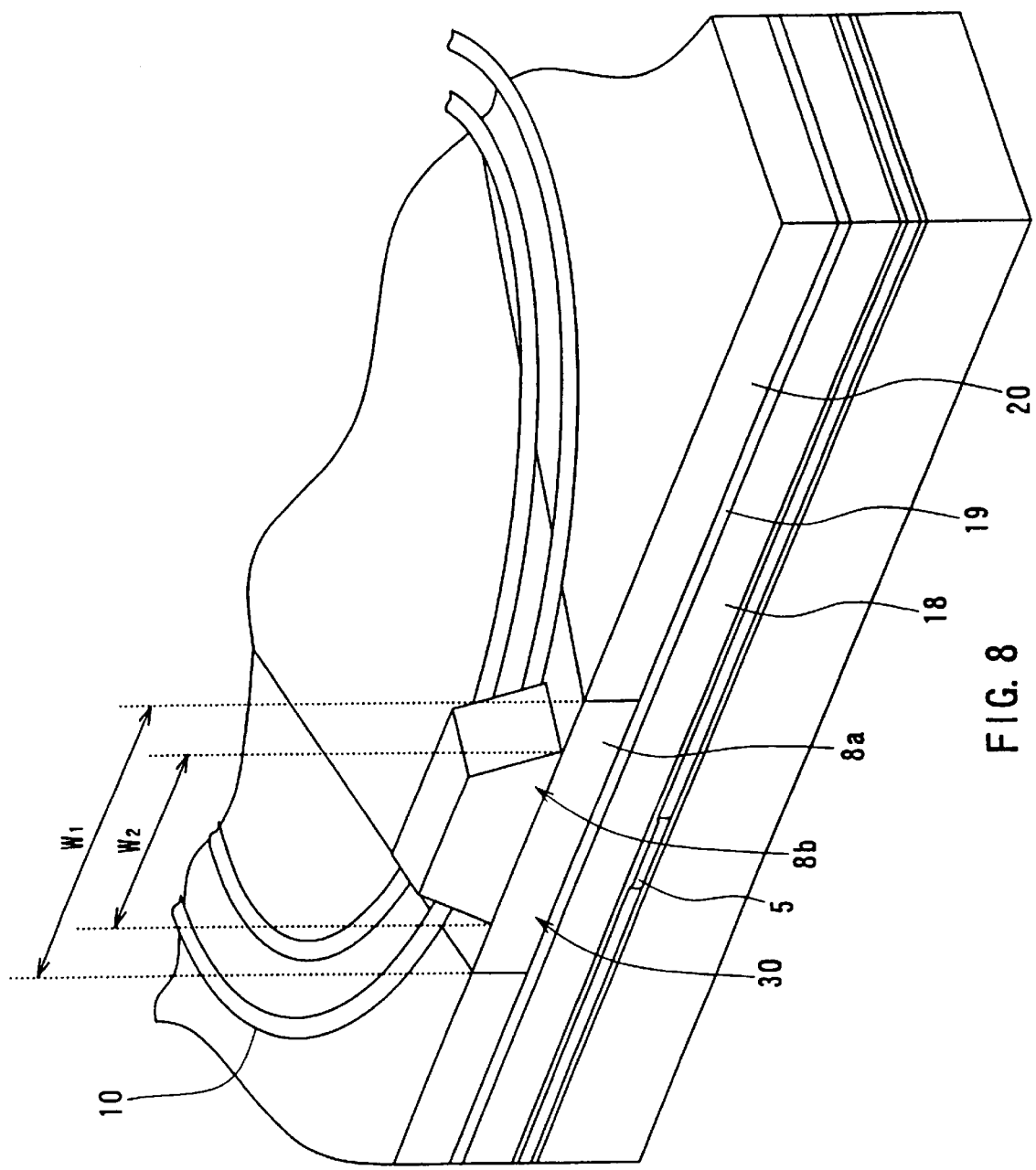
FIG. 8 is a perspective view illustrating the neighborhood of the bottom pole layer of the thin-film magnetic head of the first embodiment in a step in the manufacturing method.

FIG. 8 is a perspective view illustrating the neighborhood of the first layer 8a and the second layer 8b of the bottom pole layer 8 at this point in the manufacturing steps. As shown, the width of the first layer 8a decreases as the distance from the air bearing surface 30 decreases. In FIG. 8 numeral 20 indicates the insulating layer flattened together with the first layer 8a. The second layer 8b is placed on the top surface of the first layer 8a in a region near an end of the first layer 8a located in the air bearing surface 30, such that a surface of the second layer 8b is exposed from the air bearing surface 30. In FIG. 8 width $W_2$ of the second layer 8b measured in the air bearing surface 30 is smaller than width $W_1$ of the first layer 8a measured in the air bearing surface 30. However, width $W_2$ may be equal to width $W_1$. Although the width of the second layer 8b decreases as the distance from the air bearing surface 30 decreases in FIG. 8, this width may be constant. Although the width of the second layer 8b decreases as the distance from the top surface of the first layer 8a increases in FIG. 8, this width may be constant too.

Next, as shown in FIG. 4A and FIG. 4B, an insulating layer 11 of alumina, for example, having a thickness of about 3 to 4 μm is formed over the entire surface. The insulating layer 11 is then polished through CMP, for example, until the second layer 8b and the third layer 8c of the bottom pole layer 8 are exposed, and the surface is flattened. Although the thin-film coil 10 is not exposed in FIG. 4A and FIG. 4B, the coil 10 may be exposed.

Next, a recording gap layer 12 made of an insulating material whose thickness is 0.2 to 0.3 μm, for example, is formed on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of an alumina film is formed through CVD, materials used are trimethyl aluminum (Al (CH$_3$)$_3$) and H$_2$O, for example. Through the use of CVD, it is possible to make the thin and precise recording gap layer 12 with few pinholes.

Next, a portion of the recording gap layer 12 located on top of the third layer 8c is etched to form a contact hole for making the magnetic path. Portions of the recording gap layer 12 and the insulating layer 11 located on top of the connecting portion 10a of the coil 10 are etched to form a contact hole.

Figures 5A, 5B:
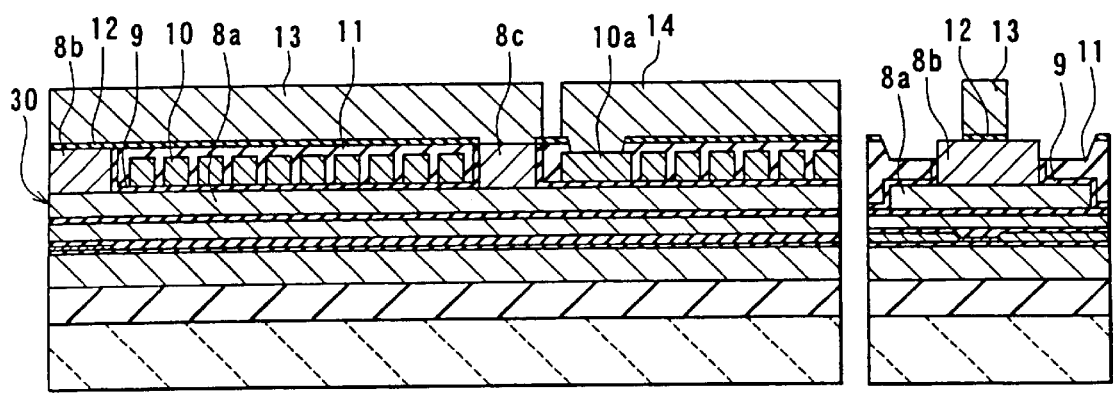
FIG. 5A and FIG. 5B are cross sections for illustrating a step that follows FIG. 4A and FIG. 4B.

Next, as shown in FIG. 5A and FIG. 5B, on the recording gap layer 12, the top pole layer 13 having a thickness of about 2.0 to 3.0 μm is formed in a region extending from the air bearing surface 30 to the portion on top of the third layer 8c of the bottom pole layer 8. In addition, the conductive layer 14 having a thickness of about 3 to 4 μm is formed. The conductive layer 14 is connected to the portion 10a of the thin-film coil 10. The top pole layer 13 is connected to the third layer 8c of the bottom pole layer 8 through the contact hole formed in the portion on top of the third layer 8c.

The top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. In order to improve the high frequency characteristic, the top pole layer 13 may be made up of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as BCl$_2$ or Cl$_2$, or a fluorine-base gas such as CF$_4$ or SF$_6$, for example.

Figures 6A, 6B:
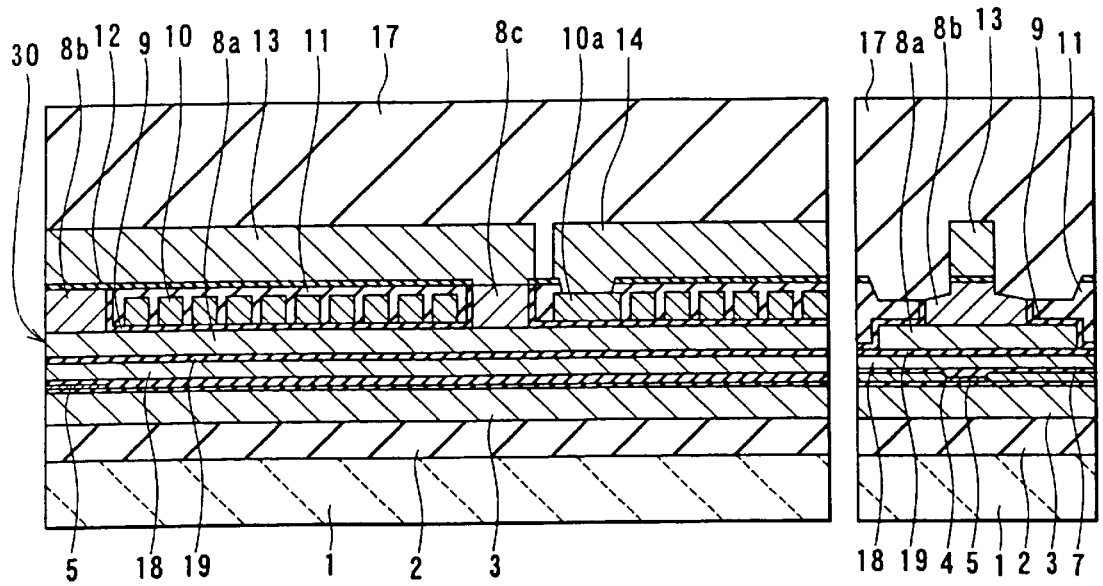
FIG. 6A and FIG. 6B are cross sections of the thin-film magnetic head of the first embodiment.

Next, as shown in FIG. 6A and FIG. 6B, the second layer 8b of the bottom pole layer 8 is selectively etched by about 0.3 to 0.6 μm through argon ion milling, for example, with the top pole layer 13 as a mask. A trim structure as shown in FIG. 6B is thus formed. The trim structure suppresses an increase in the effective track width due to expansion of a magnetic flux generated during writing in a narrow track.

Figure 9:
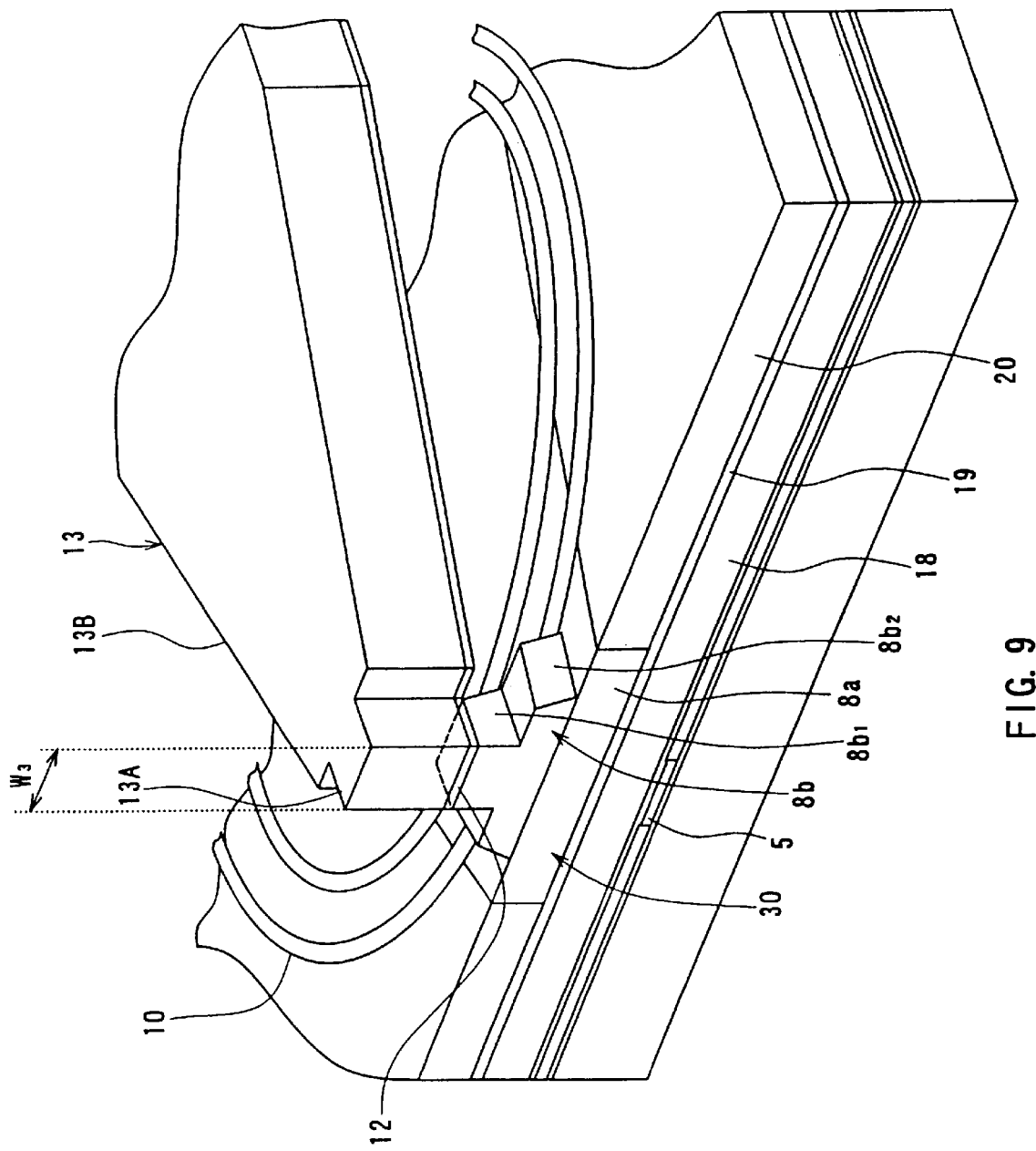
FIG. 9 is a perspective view illustrating the neighborhood of the top and bottom pole layers of the thin-film magnetic head of the first embodiment.

FIG. 9 is a perspective view illustrating the neighborhood of the top pole layer 13 and the bottom pole layer 8 at this point in the manufacturing steps. As shown, the top pole layer 13 has a first portion 13A and a second portion 13B in the order in which the closest to the air bearing surface 30 comes first. The first portion 13A has a width equal to recording track width $W_3$. The second portion 13B is greater than the first portion 13A in width. The width of the second portion 13B gradually decreases as the distance from the air bearing surface 30 decreases. The length of the first portion 13A is nearly equal to the throat height.

Through the etching of the second layer 8b of the bottom pole layer 8 with the top pole layer 13 as a mask as described above, the second layer 8b is made to have a shape including a first portion $8b_1$ closer to the recording gap layer 12 and a second portion $8b_2$ farther from the recording gap layer 12.

The width of the first portion $8b_1$ is smaller than that of the second portion $8b_2$, and equal to the width of the first portion 13A of the top pole layer 13, that is, recording track width $W_3$.

Next, as shown in FIG. 6A and FIG. 6B, an overcoat layer 17 of alumina, for example, having a thickness of 20 to 40 $\mu$m is formed over the entire surface. The surface of the overcoat layer 17 is then flattened and pads (not shown) for electrodes are formed on the overcoat layer 17. Finally, lapping of the slider is performed to form the air bearing surface 30 of the thin-film magnetic head including the recording head and the reproducing head. The thin-film magnetic head of the embodiment is thus completed.

In this embodiment the bottom pole layer 8 made up of the first layer 8a, the second layer 8b and the third layer 8c corresponds to a first magnetic layer of the invention. The top pole layer 13 corresponds to a second magnetic layer of the invention. The bottom shield layer 3 corresponds to a first shield layer of the invention. The top shield layer 18 corresponds to a second shield layer of the invention.

Figure 7:
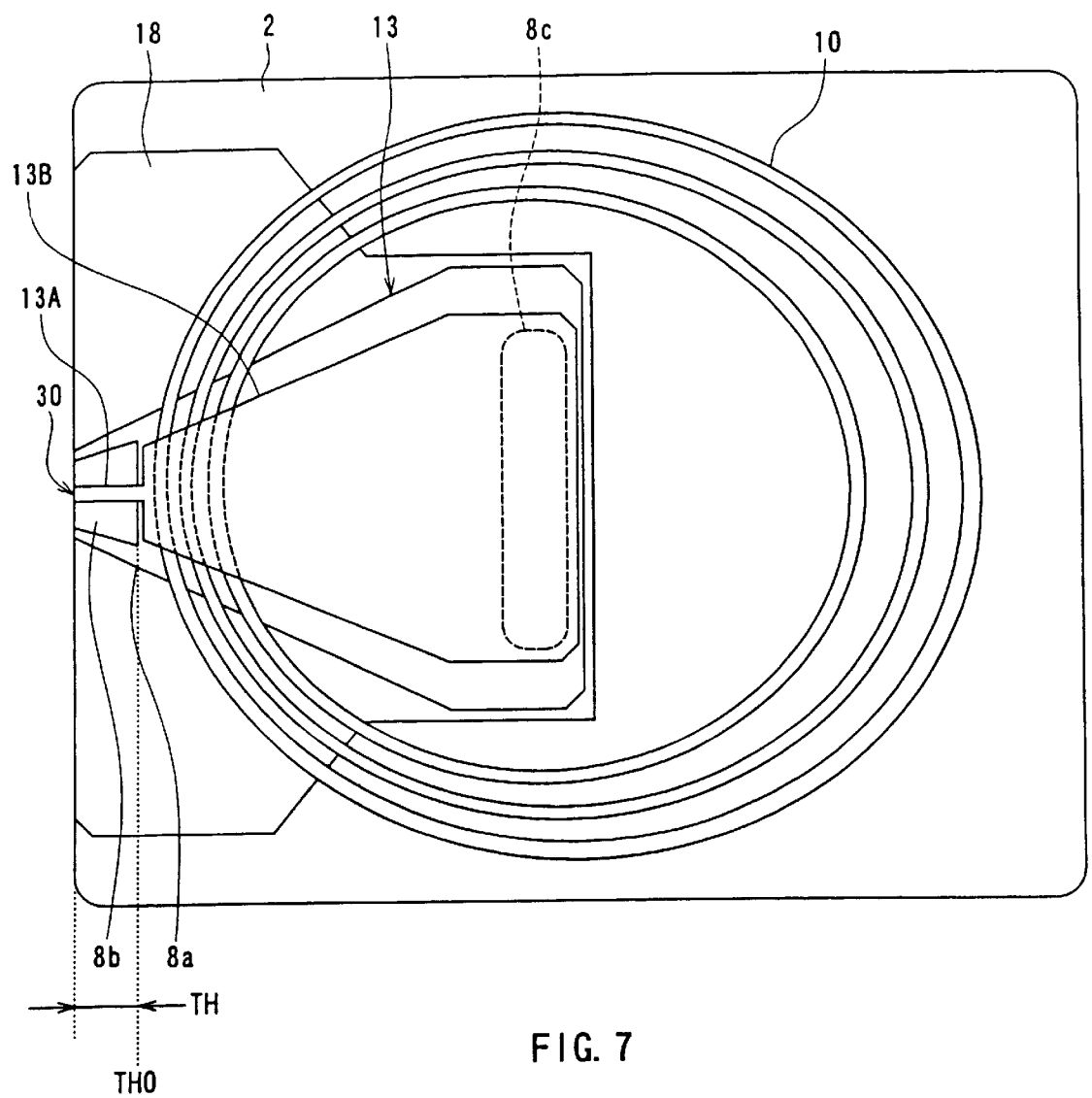
FIG. 7 is a top view of the thin-film magnetic head of the first embodiment.

FIG. 7 is a top view of the thin-film magnetic head of the embodiment, wherein the overcoat layer 17 and the other insulating layers and films are omitted. In FIG. 7 'TH' indicates the throat height and 'THO' indicates the zero throat height position.

As described so far, the thin-film magnetic head of the embodiment comprises the reproducing head and the recording head. The reproducing head has: the MR element 5; and the bottom shield layer 3 and the top shield layer 18 for shielding the MR element 5. Portions of the bottom shield layer 3 and the top shield layer 18 located in a region on a side of the medium facing surface (air bearing surface 30) facing toward a recording medium are opposed to each other, the MR element 5 being placed between those portions.

The recording head has the bottom pole layer 8 (including the first layer 8a, the second layer 8b and the third layer 8c) and the top pole layer 13 magnetically coupled to each other, each of which includes at least one layer. The bottom pole layer 8 and the top pole layer 13 include pole portions opposed to each other and placed in regions on a side of the medium facing surface. The recording head further has: the recording gap layer 12 placed between the pole portion of the bottom pole layer 8 and the pole portion of the top pole layer 13; and the thin-film coil 10 at least a part of which is placed between the bottom pole layer 8 and the top pole layer 13, the at least part of the coil 10 being insulated from the bottom pole layer 8 and the top pole layer 13.

In this embodiment the bottom pole layer 8 includes: the first layer 8a located in a region facing toward at least a part of the thin-film coil 10, the insulating film 9 being placed between the first layer 8a and the coil 10; and the second layer 8b connected to a surface of the first layer 8a that faces toward the coil 10 (the upper side of FIG. 6A). The second layer 8b has a portion that forms the pole portion. As shown in FIG. 7 and FIG. 9, the width of the first layer 8a gradually decreases as the distance from the air bearing surface 30 decreases. As shown in FIG. 9, the second layer 8b includes the first portion $8b_1$ closer to the recording gap layer 12 and the second portion $8b_2$ farther from the recording gap layer 12. The width of the first portion $8b_1$ is smaller than that of the second portion $8b_2$. The thin-film coil 10 is located on a side of the second layer 8b (that is, on the right side of FIG. 6A).

In this embodiment the throat height is defined by an end of the second layer 8b opposite to the air bearing surface 30 (that is, on the right side of FIG. 6A). In the embodiment the recording track width is defined by the first portion 13A of the top pole layer 13.

According to the embodiment thus described, the throat height is defined by the second layer 8b of the bottom pole layer 8. The recording track width is defined by the top pole layer 13. The thin-film coil 10 is located on a side of the second layer 8b. As a result, the top pole layer 13 that defines the recording track width is formed on the flat surface with accuracy. Therefore, it is possible to precisely control the recording track width even if the recording track width is reduced down to the half-micron or quarter-micron order. According to the embodiment, the second layer 8b includes the first portion $8b_1$ closer to the recording gap layer 12. The first portion $8b_1$ has the width equal to the width of the first portion 13A of the top pole layer 13, that is, the recording track width. As a result, an increase in the effective track width is prevented. As thus described, the embodiment achieves a reduction in the track width of the recording head (induction-type magnetic transducer).

In the embodiment the thin-film coil 10 is located on a side of the second layer 8b of the bottom pole layer 8 and formed on the flat insulating film 9. It is thereby possible to form the thin-film coil 10 of small dimensions with accuracy. Furthermore, according to the embodiment, it is possible that an end of the coil 10 is placed near the end of the second layer 8b, since no apex exists.

As thus described, according to the embodiment, the yoke length is a reduced by about 30 to 40 percent of that of a prior-art head, for example. As a result, it is possible to utilize a magnetomotive force generated by the thin-film coil 10 for writing with efficiency. It is therefore possible to provide a thin-film magnetic head having a recording head with an excellent high frequency characteristic, an excellent NLTS characteristic and an excellent overwrite property that is a parameter indicating one of characteristics when data is written over existing data.

According to the embodiment, a reduction in yoke length is achieved. As a result, it is possible to greatly reduce the entire length of the thin-film coil 10 without changing the number of turns of the coil. The resistance of the coil 10 is thereby reduced. It is therefore possible to reduce the thickness of the coil 10.

In this embodiment the width of the first layer 8a of the bottom pole layer 8 decreases as the distance from the air bearing surface 30 decreases. If the second layer 8b is placed on the first layer 8a without such a configuration of the first layer 8a, the cross-sectional area of the magnetic path abruptly decreases in the portion connecting the first layer 8a to the second layer 8b. As a result, a magnetic flux may be saturated in this portion. This problem more frequently occurs when the throat height is small.

According to the embodiment, in contrast, the width of the first layer 8a decreases as the distance from the air bearing surface 30 decreases. As a result, it is impossible that the cross-sectional area of the magnetic path abruptly decreases from a portion of the first layer 8a facing toward the thin-film coil 10 to the second layer 8b. Therefore, saturation of a magnetic flux halfway through the magnetic path is prevented. According to the embodiment, it is thereby possible to utilize the magnetomotive force generated by the thin-film coil 10 for writing with efficiency.

According to the embodiment, the width of the second layer 8b measured in the air bearing surface 30 decreases in a step-by-step manner, that is, from the width of the second portion $8b_2$ located farther from the recording gap layer 12 to the width of the first portion $8b_1$ located closer to the recording gap layer 12. In this way, the width of the second layer 8b measured in the air bearing surface 30 decreases as the distance from the recording gap layer 12 decreases. As a result, it is impossible that the cross-sectional area of the magnetic path abruptly decreases in a region extending from a portion of the first layer 8a near the air bearing surface 30 through the second layer 8b toward the recording gap layer 12, either. Therefore, it is possible to prevent saturation of a magnetic flux halfway through the magnetic path. If the width of the second layer 8b measured in the air bearing surface 30 is smaller than the width of the first layer 8a measured in the air bearing surface 30, in particular, the width of the bottom pole layer 8 decreases in two steps in the above-mentioned region. It is thus possible to prevent saturation of a magnetic flux halfway through the magnetic path more effectively.

In this embodiment the bottom pole layer 8 of the recording head does not function as the top shield layer of the reproducing head. Instead, the bottom pole layer 8 and the top shield layer 18 are provided as separate layers adjacent to each other, the insulating film 19 separating the bottom pole layer 8 and the top shield layer 18. Therefore, even though the width of the first layer 8a of the bottom pole layer 8 decreases as the distance from the air bearing surface 30 decreases, it is possible that the top shield layer 18 has a wide area, and a sufficient property for shielding the MR element 5 is obtained. Alternatively, it is possible that the width of the first layer 8a decreases as the distance from the air bearing surface 30 decreases while the first layer 8a functions as the top shield layer of the reproducing head as well, and a portion of the first layer 8a facing toward the MR element 5 has a width enough to achieve a sufficient property for shielding the MR element 5.

According to the embodiment, the insulating film 9 is provided between the second layer 8b of the bottom pole layer 8 and the thin-film coil 10. The insulating film 9 is thin and made of an inorganic insulation material that achieves sufficient insulation strength. High insulation strength is thereby obtained between the second layer 8b and the coil 10.

In the embodiment the thin-film coil 10 is covered with the insulating layer 11 made of an inorganic insulation material. It is thereby possible to prevent the pole portion from protruding toward a recording medium due to expansion resulting from heat generated around the coil 10 when the thin-film magnetic head is used.

[Second Embodiment]

Reference is now made to FIG. 10A to FIG. 13A, FIG. 10B to FIG. 13B, and FIG. 14 to describe a thin-film magnetic head and a method of manufacturing the same of a second embodiment of the invention. FIG. 10A to FIG. 13A are cross sections each orthogonal to an air bearing surface. FIG. 10B to FIG. 13B are cross sections of the pole portion each parallel to the air bearing surface.

The steps of the manufacturing method of the second embodiment performed until the insulating film 9 is formed are similar to those of the first embodiment.

Figures 10A, 10B:
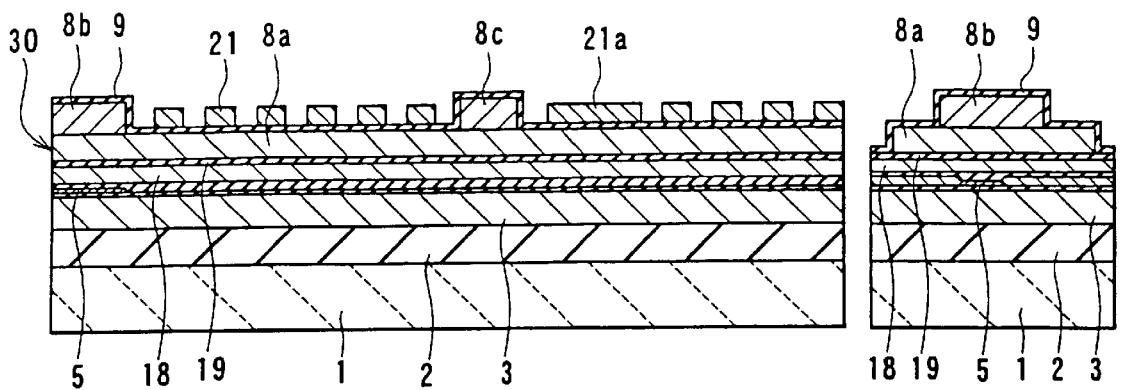
FIG. 10A and FIG. 10B are cross sections for illustrating a step in a method of manufacturing a thin-film magnetic head of a second embodiment of the invention.

In the following step of the second embodiment, as shown in FIG. 10A and FIG. 10B, a first layer 21 of the thin-film coil made of copper, for example, is formed by frame plating. For example, the thickness of the first layer 21 is about 1.0 to 2.0 μm and the pitch is 1.2 to 2.0 μm. In the drawings numeral 21a indicates a portion for connecting the first layer 21 to a second layer of the coil described later.

Figures 11A, 11B:
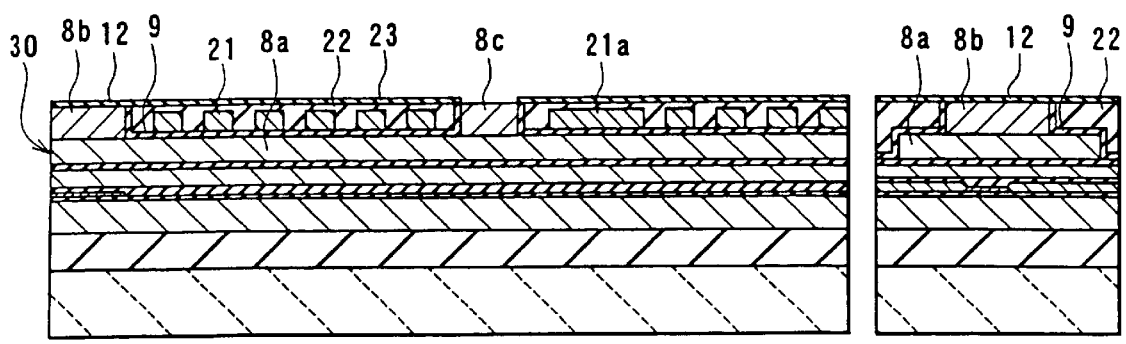
FIG. 11A and FIG. 11B are cross sections for illustrating a step that follows FIG. 10A and FIG. 10B.

Next, as shown in FIG. 11A and FIG. 11B, an insulating layer 22 of alumina, for example, having a thickness of about 3 to 4 μm is formed over the entire surface. The insulating layer 22 is then polished through CMP, for example, until the second layer 8b and the third layer 8c of the bottom pole layer 8 are exposed, and the surface is flattened. Although the first layer 21 of the coil is not exposed in FIG. 11A and FIG. 11B, the first layer 21 may be exposed.

Next, the recording gap layer 12 made of an insulating material whose thickness is 0.2 to 0.3 μm, for example, is formed on the second layer 8b and the third layer 8c of the bottom pole layer 8 exposed and the insulating layer 22.

Next, a portion of the recording gap layer 12 located on top of the third layer 8c is etched to form a contact hole for making the magnetic path.

Next, as shown in FIG. 12A and FIG. 12B, on the recording gap layer 12, a pole portion layer 13a having a thickness of 2.0 to 3.0 μm, for example, is formed. The pole portion layer 13a includes a pole portion of the top pole layer 13. In addition, a magnetic layer 13b having a thickness of 2.0 to 3.0 μm, for example, is formed in the contact hole provided in the portion on top of the third layer 8c of the bottom pole layer 8. The top pole layer 13 of this embodiment is made up of the pole portion layer 13a and the magnetic layer 13b, and a yoke portion layer 13c described later. The magnetic layer 13b is provided for connecting the yoke portion layer 13c to the third portion 8c of the bottom pole layer 8. In this embodiment the length of the pole portion layer 13a between an end located in the air bearing surface 30 and the other end is greater than the throat height.

The pole portion layer 13a and the magnetic layer 13b of the top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 13A and FIG. 13B, the recording gap layer 12 is selectively etched through dry etching, using the pole portion layer 13a as a mask. The dry etching may be RIE using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 μm through argon ion milling, for example. A trim structure as shown in FIG. 13B is thus formed.

Next, an insulating film 23 of alumina, for example, having a thickness of about 0.3 to 0.5 μm is formed over the entire surface.

Next, portions of the insulating film 23, the recording gap layer 12 and the insulating layer 22 located on top of the connecting portion 21a are etched to form a contact hole. Next, the second layer 24 of the thin-film coil made of copper, for example, is formed by frame plating. For example, the thickness of the second layer 24 is about 1.0 to 2.0 μm and the pitch is 1.2 to 2.0 μm. In the drawings numeral 24a indicates a portion for connecting the second layer 24 to the first layer 21 of the coil.

Next, an insulating layer 25 of alumina, for example, having a thickness of about 3 to 4 μm is formed over the entire surface. The insulating layer 25 is then polished through CMP, for example, so that the pole portion layer 13a and the magnetic layer 13b of the top pole layer 13 are exposed, and the surface is flattened. Although the second layer 24 is not exposed in FIG. 13A and FIG. 13B, the second layer 24 may be exposed. If the second layer 24 is exposed, another insulating layer is formed to cover the second layer 24 and the insulating layer 25.

Next, the yoke portion layer 13c having a thickness of 2.0 to 3.0 µm, for example, is formed on the pole portion layer 13a and the magnetic layer 13b of the top pole layer 13 flattened and the insulating layer 25. The yoke portion layer 13c provided for the recording head is made of a magnetic material and forms a yoke portion of the top pole layer 13. The yoke portion layer 13c is in contact and magnetically coupled to the third layer 8c of the bottom pole layer 8 through the magnetic layer 13b. The yoke portion layer 13c may be made of NiFe (80 weight % Ni and 20 weight % Fe), or NiFe (45 weight % Ni and 55 weight % Fe) as a high saturation flux density material and formed through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 13c may be made of a number of layers of inorganic insulating films and magnetic layers of Permalloy, for example.

In this embodiment an end face of the yoke portion layer 13c facing toward the air bearing surface 30 is located at a distance from the air bearing surface 30 (that is, on the right side of FIG. 13A).

Next, an overcoat layer 27 of alumina, for example, having a thickness of 20 to 40 µm is formed over the entire surface. The surface of the overcoat layer 27 is then flattened and pads (not shown) for electrodes are formed on the overcoat layer 27. Finally, lapping of the slider is performed to form the air bearing surface 30 of the thin-film magnetic head including the recording head and the reproducing head. The thin-film magnetic head of the embodiment is thus completed.

In this embodiment the top pole layer 13 made up of the pole portion layer 13a, the magnetic layer 13b and the yoke portion layer 13c corresponds to the second magnetic layer of the invention.

Figure 14:
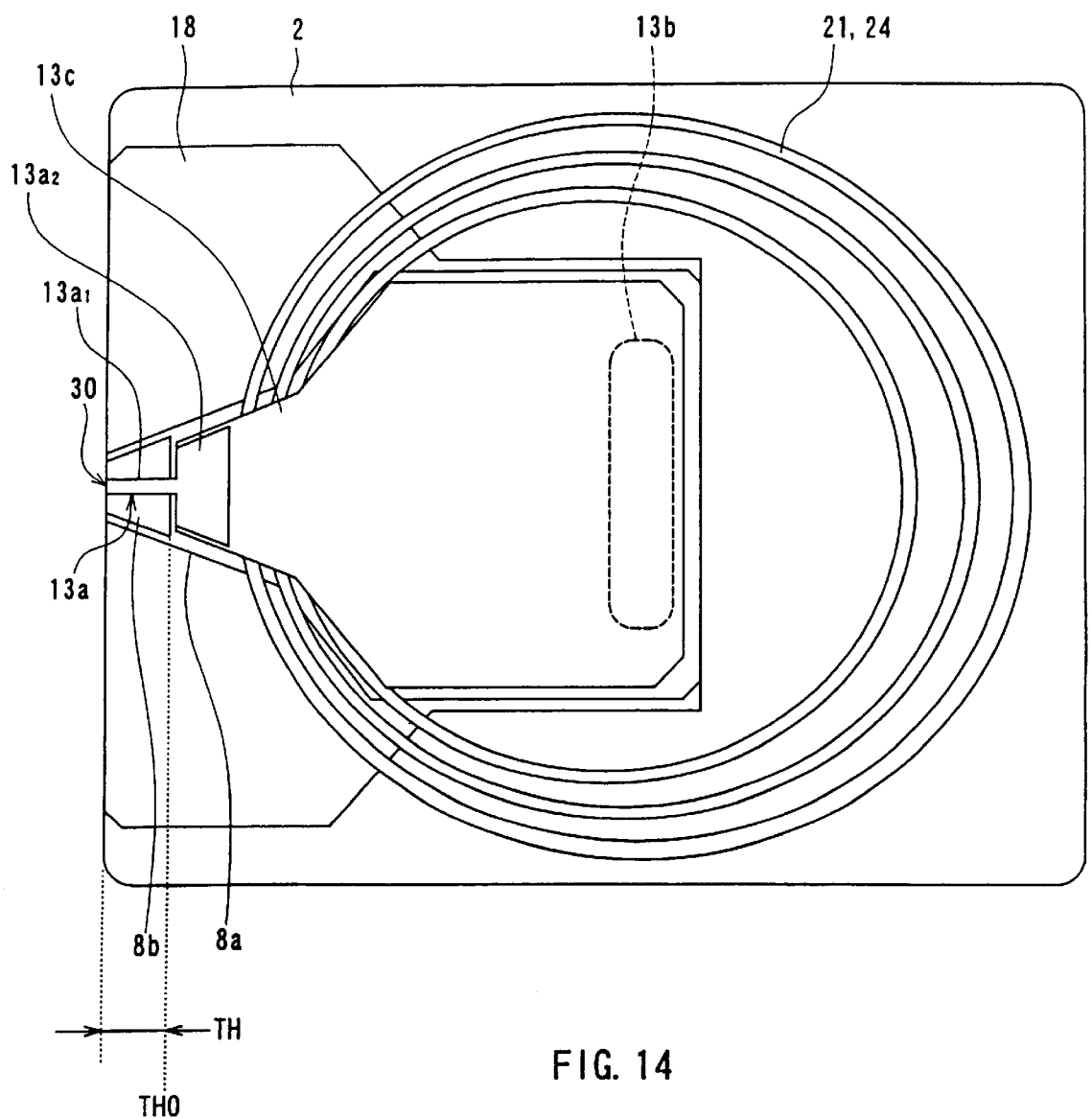
FIG. 14 is a top view of the thin-film magnetic head of the second embodiment.
Figure 19:
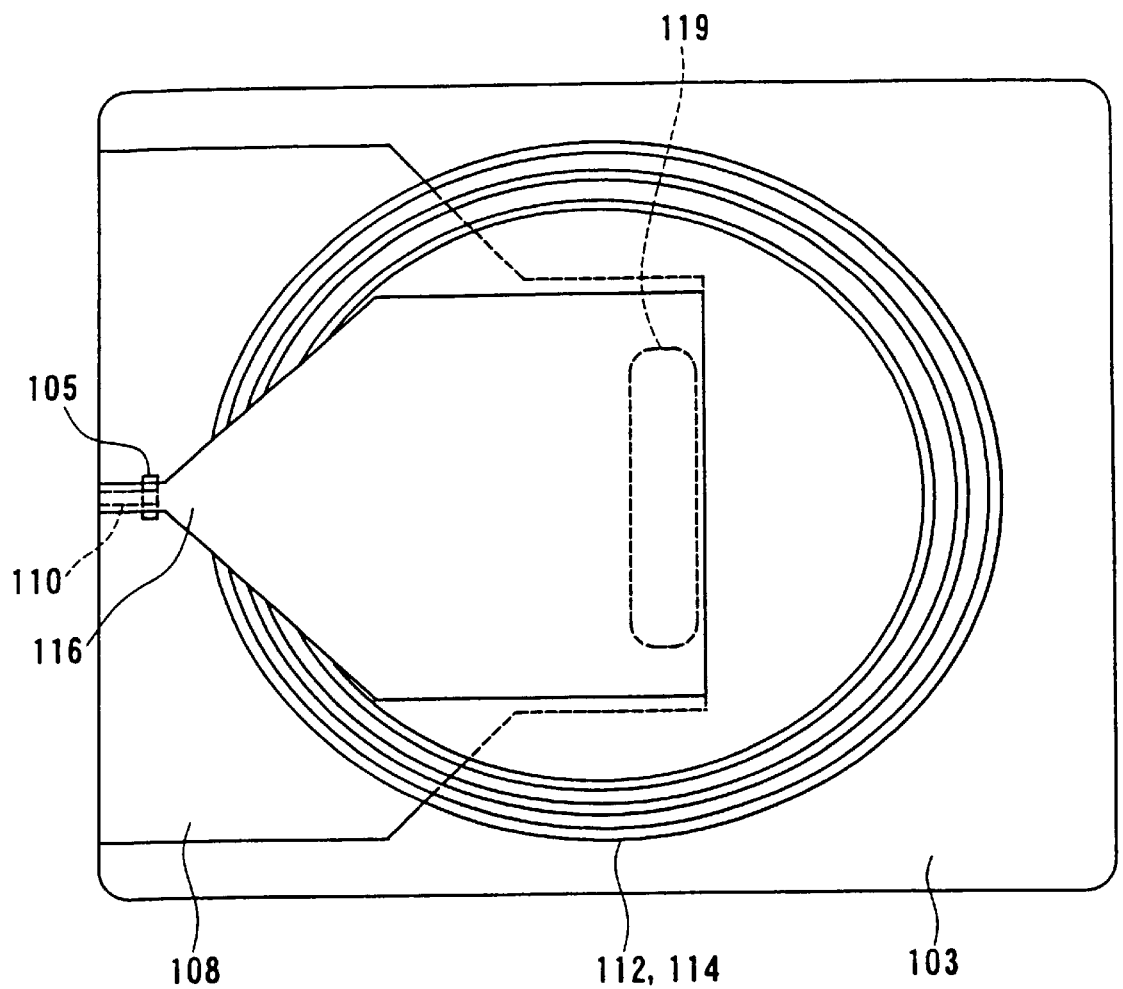
FIG. 19 is a top view of the related-art magnetic head.

FIG. 14 is a top view of the thin-film magnetic head of the embodiment, wherein the overcoat layer 27 and the other insulating layers and films are omitted. In FIG. 14 'TH' indicates the throat height and 'THO' indicates the zero throat height position. As shown, the pole portion layer 13a of the top pole layer 13 includes: a first portion $13a_1$ located closer to the air bearing surface 30 and a second portion $13a_2$ coupled to the first portion $13a_1$ and located farther from the air bearing surface 30. The first portion $13a_1$ has a width equal to the recording track width. The second portion $13a_2$ is greater than the first portion $13a_1$ in width. The interface between the first portion $13a_1$ and the second portion $13a_2$ (the position of the stepped portion between the first portion $13a_1$ and the second portion $13a_2$) is located near zero throat height position TH0.

The yoke portion layer 13c of the top pole layer 13 has a portion overlaying the pole portion layer 13a. This portion of the yoke portion layer 13c has a width nearly equal to that of the pole portion layer 13a. The width of the yoke portion layer 13c increases in the direction opposite to the air bearing surface 30, and finally becomes constant.

According to the embodiment thus described, the first layer 21 of the thin-film coil is located on a side of the second layer 8b of the bottom pole layer 8. The top surface of the insulating layer 22 covering the first layer 21 is flattened, together with the top surface of the second layer 8b. As a result, the pole portion layer 13a of the top pole layer 13 that defines the recording track width is formed on the flat surface. Therefore, according to the embodiment, it is possible to form the pole portion layer 13a with accuracy even if the recording track width is reduced down to the half-micron or quarter-micron order. A reduction in the recording track width is thus achieved.

In the embodiment the second layer 24 of the thin-film coil is located on a side of the pole portion layer 13a of the top pole layer 13. The top surface of the insulating layer 25 covering the second layer 24 is flattened, together with the top surface of the pole portion layer 13a. As a result, the yoke portion layer 13c of the top pole layer 13 is formed on the flat surface, too. It is thereby possible to form the yoke portion layer 13c of small dimensions. It is thus possible to prevent 'side write', that is, writing of data in a region of a recording medium where data is not supposed to be written.

In the embodiment an end face of the yoke portion layer 13c facing toward the air bearing surface 30 is located at a distance from the air bearing surface 30. As a result, it is impossible that the yoke portion layer 13c is exposed from the air bearing surface 30 even if the throat height is low. Side write is thereby prevented.

According to the embodiment, the length of the pole portion layer 13a between an end thereof facing toward the air bearing surface 30 and the other end is greater than the throat height. Therefore, portions of the pole portion layer 13a and the yoke portion layer 13c touch each other in the region farther from the air bearing surface 30 than the zero throat height position, too. As a result, according to the embodiment, it is impossible that the cross-sectional area of the magnetic path abruptly decreases in the top pole layer 13. It is thus possible to prevent a magnetic flux from saturating halfway through the magnetic path.

According to the embodiment, the insulating film 23 made of an inorganic material is provided between the first layer 21 and the second layer 24 of the thin-film coil, in addition to the recording gap layer 12. High insulation strength is thereby obtained between the first layer 21 and the second layer 24 of the coil. In addition, it is possible to reduce flux leakage from the layers 21 and 24 of the coil.

The remainder of the configuration, functions and effects of the embodiment are similar to those of the first embodiment.

The present invention is not limited to the foregoing embodiments but may be practiced in still other ways. In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between.

The invention may be applied to a thin-film magnetic head dedicated to writing that has an induction-type magnetic transducer only or to a thin-film magnetic head performing writing and reading through an induction-type magnetic transducer.

According to the thin-film magnetic head or the method of manufacturing the same of the invention thus described, the throat height is defined by the second layer of one of the magnetic layers. The track width is defined by the other of the magnetic layers. At least a part of the thin-film coil is located on a side of the second layer. As a result, it is possible that the other of the magnetic layers that defines the track width is formed on the flat surface with accuracy. A reduction in the track width of the induction-type magnetic transducer is thus achieved. According to the invention, at least a part of the thin-film coil is located on a side of the second layer. It is therefore possible that an end of the at least part of the thin-film coil is located near an end of the second layer. A reduction in yoke length is thereby achieved. According to the invention, the width of the first layer of the one of the magnetic layers decreases as the distance from the medium facing surface decreases. As a result, it is impossible that the cross-sectional area of the magnetic path abruptly decreases from the first layer to the second layer. It is thus possible to prevent saturation of a magnetic flux halfway through the magnetic path.

According to the thin-film magnetic head or the method of manufacturing the same of the invention, the width of the second layer measured in the medium facing surface may decrease as the distance from the gap layer decreases. In this case, it is impossible that the cross-sectional area of the magnetic path abruptly decreases in the region extending from a portion of the first layer near the medium facing surface through the second layer toward the gap layer, either. It is thus possible to prevent saturation of a magnetic flux halfway through the magnetic path more effectively. In this case, if the second layer includes a portion that is closest to the gap layer and has a width equal to the track width, it is further possible to prevent an increase in effective track width.

According to the head or the method of the invention, the width of the second layer measured in the medium facing surface may be smaller than the width of the first layer measured in the medium facing surface. In this case, it is impossible that the cross-sectional area of the magnetic path abruptly decreases in the region extending from a portion of the first layer near the medium facing surface through the second layer toward the gap layer, either. It is thus possible to prevent saturation of a magnetic flux halfway through the magnetic path more effectively.

According to the thin-film magnetic head or the method of manufacturing the same of the invention, an insulating layer may be further provided. The insulating layer covers the at least part of the thin-film coil located on the side of the second layer. A surface of the insulating layer facing toward the gap layer is flattened together with a surface of the second layer facing toward the gap layer. In this case, in particular, the magnetic layer that defines the track width is formed on the flat surface with accuracy.

According to the head or the method of the invention, the other of the magnetic layers may include the pole portion layer including the pole portion and the yoke portion layer forming the yoke portion. In addition, an end face of the yoke portion layer facing toward the medium facing surface may be located at a distance from the medium facing surface. In this case, it is possible to prevent writing of data in a region where data is not supposed to be written.

According to the head or the method of the invention, the thin-film coil may include: the first layer portion located on a side of the second layer of the one of the magnetic layers; and the second layer portion located on a side of the pole portion layer of the other of the magnetic layers. In addition, the first insulating layer and the second insulating layer may be further provided. The first insulating layer covers the first layer portion of the coil and has a surface facing toward the gap layer, the surface being flattened together with a surface of the second layer facing toward the gap layer. The second insulating layer covers the second layer portion of the coil and has a surface facing toward the yoke portion layer, the surface being flattened together with a surface of the pole portion layer facing toward the yoke portion layer. In this case, it is possible to form the yoke portion layer with accuracy.

According to the head or the method of the invention, a magnetoresistive element, and first and second shield layers for shielding the magnetoresistive element may be further provided. Portions of the first and second shield layers located in regions on a side of the medium facing surface are opposed to each other, the magnetoresistive element being placed between the portions of the shield layers. In addition, the first layer may be adjacent to the first or second shield layer while the first layer is separated from the first or second shield layer. In this case, even though the width of the first layer decreases as the distance from the medium facing surface decreases, it is possible that the shield layer adjacent to the first layer has a wide area. A sufficient property for shielding the magnetoresistive element is therefore obtained.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head, comprising:
   a medium facing surface that faces toward a recording medium;
   a first magnetic layer and a second magnetic layer magnetically coupled to each other and including magnetic pole portions opposed to each other and placed in regions of the magnetic layers on a side of the medium facing surface, each of the magnetic layers including at least one layer;
   a gap layer provided between the pole portions of the first and second magnetic layers; and
   a thin-film coil at least a part of which is placed between the first and second magnetic layers, the at least part of the coil being insulated from the first and second magnetic layers, wherein one of the magnetic layers includes:
   a first layer located in a region facing toward the at least part of the thin-film coil, the first layer having a width that decreases as a distance from the medium facing surface decreases; and
   a second layer connected to a surface of the first layer facing toward the thin-film coil, the second layer including one of the pole portions and defining a throat height;
   the at least part of the thin-film coil is located on a side of the second layer; and
   the other of the magnetic layers includes a portion that defines a track width, the thin-film magnetic head further comprising an insulating layer that covers the at least part of the thin-film coil located on the side of the second layer, and has a surface facing toward the gap layer, the surface being flattened together with a surface of the second layer facing toward the gap layer.

2. The thin-film magnetic head according to claim 1 wherein a width of the second layer measured in the medium facing surface decreases as a distance from the gap layer decreases.

3. The thin-film magnetic head according to claim 2 wherein the second layer includes a portion that is closest to the gap layer and has a width equal to the track width.

4. The thin-film magnetic head according to claim 1 wherein a width of the second layer measured in the medium facing surface is smaller than a width of the first layer measured in the medium facing surface.

5. The thin-film magnetic head according to claim 1 wherein the other of the magnetic layers is made up of one layer.

6. The thin-film magnetic head according to claim 1 wherein the other of the magnetic layers includes: a pole portion layer including the other of the pole portions; and a yoke portion layer forming a yoke portion and connected to the pole portion layer.

7. The thin-film magnetic head according to claim 6 wherein an end face of the yoke portion layer facing toward the medium facing surface is located at a distance from the medium facing surface.

8. The thin-film magnetic head according to claim 6 wherein the thin-film coil includes: a first layer portion located on a side of the second layer of the one of the magnetic layers; and a second layer portion located on a side of the pole portion layer of the other of the magnetic layers.

9. The thin-film magnetic head according to claim 1, further comprising: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

10. The thin-film magnetic head according to claim 9 wherein the first layer is adjacent to the first or second shield layer while the first layer is separated from the first or second shield layer.

11. A method of manufacturing a thin-film magnetic head comprising a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers, the method including the steps of:

forming the first magnetic layer;

forming the gap layer on the first magnetic layer;

forming the second magnetic layer on the gap layer; and forming the thin-film coil such that the at least part of the coil is placed between the first and second magnetic layers, the at least part of the coil being insulated from the first and second magnetic layers, wherein the step of forming one of the magnetic layers includes the steps of:

forming a first layer located in a region facing toward the at least part of the thin-film coil, the first layer having a width that decreases as a distance from the medium facing surface decreases; and forming a second layer connected to a surface of the first layer facing toward the thin-film coil, the second layer including one of the pole portions and defining a throat height;

the at least part of the thin-film coil is located on a side of the second layer in the step of forming the coil;

a portion that defines a track width is formed in the step of forming the other of the magnetic layers; and the one of the magnetic layers is the first magnetic layer and the other of the magnetic layers is the second magnetic layer, the method further including the step of:

forming an insulating layer that covers the at least part of the thin-film coil located on the side of the second layer, and has a surface facing toward the gap layer, the surface being flattened together with a surface of the second layer facing toward the gap layer.

12. The method according to claim 11 wherein the second layer is formed such that a width of the second layer measured in the medium facing surface decreases as a distance from the gap layer decreases.

13. The method according to claim 12 wherein the second layer is formed to include a portion that is closest to the gap layer and has a width equal to the track width.

14. The method according to claim 11 wherein the second layer is formed such that a width of the second layer measured in the medium facing surface is smaller than a width of the first layer measured in the medium facing surface.

15. The method according to claim 11 wherein the other of the magnetic layers is made up of one layer.

16. The method according to claim 11 wherein the step of forming the other of the magnetic layers includes formation of: a pole portion layer including the other of the pole portions; and a yoke portion layer forming a yoke portion and connected to the pole portion layer.

17. The method according to claim 16 wherein an end face of the yoke portion layer facing toward the medium facing surface is located at a distance from the medium facing surface in the step of forming the other of the magnetic layers.

18. The method according to claim 16 wherein the step of forming the thin-film coil includes formation of: a first layer portion located on a side of the second layer of the one of the magnetic layers; and a second layer portion located on a side of the pole portion layer of the other of the magnetic layers.

19. The method according to claim 11 further including the step of forming: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

20. The method according to claim 19 wherein the first layer is adjacent to the first or second shield layer while the first layer is separated from the first or second shield layer.

21. A thin-film magnetic head, comprising:

a medium facing surface that faces toward a recording medium;

a first magnetic layer and a second magnetic layer magnetically coupled to each other and including magnetic pole portions opposed to each other and placed in regions of the magnetic layers on a side of the medium facing surface, each of the magnetic layers including at least one layer;

a gap layer provided between the pole portions of the first and second magnetic layers; and a thin-film coil at least a part of which is placed between the first and second magnetic layers, the at least part of the coil being insulated from the first and second magnetic layers, wherein one of the magnetic layers includes:

a first layer located in a region facing toward the at least part of the thin-film coil, the first layer having a width that decreases as a distance from the medium facing surface decreases; and a second layer connected to a surface of the first layer facing toward the thin-film coil, the second layer including one of the pole portions and defining a throat height, the other of the magnetic layers includes:

a pole portion layer including the other of the pole portions and having a first surface touching the gap layer and a second surface opposite to the first surface; and a yoke portion layer forming a yoke portion and connected to the second surface of the pole portion layer, and the pole portion layer includes a portion that defines a track width;

and the thin-film coil includes:

a first layer portion located on a side of the second layer of the one of the magnetic layers; and a second layer portion located on a side of the pole portion layer of the other of the magnetic layers, the thin-film magnetic head further comprising:

a first insulating layer that covers the first layer portion of the coil and has a surface facing toward the gap layer, the surface being flattened together with a surface of the second layer facing toward the gap layer; and a second insulating layer that covers the second layer portion of the coil and has a surface facing toward the yoke portion layer, the surface being flattened together with a surface of the pole portion layer facing toward the yoke portion layer.

22. The thin-film magnetic head according to claim 21, wherein an end face of the yoke portion layer facing toward the medium facing surface is located at a distance from the medium facing surface.

23. A method of manufacturing a thin-film magnetic head, the thin-film magnetic head comprising a medium facing surface that faces toward a recording medium, a first magnetic layer and a second magnetic layer magnetically coupled to each other and including magnetic pole portions opposed to each other and placed in regions of the magnetic layers on a side of the medium facing surface, each of the magnetic layers including at least one layer, a gap layer provided between the pole portions of the first and second magnetic layers, and a thin-film coil at least a part of which is placed between the first and second magnetic layers, the at least part of the coil being insulated from the first and second magnetic layers, the method including the steps of:

forming the first magnetic layer;

forming the gap layer on the first magnetic layer;

forming the second magnetic layer on the gap layer; and forming the thin-film coil such that the at least part of the coil is placed between the first and second magnetic layers, the at least part of the coil being insulated from the first and second magnetic layers, wherein the step of forming one of the magnetic layers includes the steps of:

forming a first layer located in a region facing toward the at least part of the thin-film coil, the first layer having a width that decreases as a distance from the medium facing surface decreases; and forming a second layer connected to a surface of the first layer facing toward the thin-film coil, the second layer including one of the pole portions and defining a throat height;

the step of forming the other of the magnetic layers includes formation of:

a pole portion layer including the other of the pole portions and having a first surface touching the gap layer and a second surface opposite to the first surface; and a yoke portion layer forming a yoke portion and connected to the second surface of the pole portion layer; and the pole portion layer includes a portion that defines a track width, and the step of forming the thin-film coil includes formation of:

a first layer portion located on a side of the second layer of the one of the magnetic layers; and a second layer portion located on a side of the pole portion layer of the other of the magnetic layers, and the method further including the steps of:

forming a first insulating layer that covers the first layer portion of the coil and has a surface facing toward the gap layer, the surface being flattened together with a surface of the second layer facing toward the gap layer; and forming a second insulating layer that covers the second layer portion of the coil and has a surface facing toward the yoke portion layer, the surface being flattened together with a surface of the pole portion layer facing toward the yoke portion layer.

24. The method according to claim 22, wherein an end face of the yoke portion layer facing toward the medium facing surface is located at a distance from the medium facing surface in the step of forming the other of the magnetic layers.

* * * * *

UNITED STATES PATENT AND TRADEMARK OFFICE
CERTIFICATE OF CORRECTION

PATENT NO. : 6,577,475 B1
DATED : June 10, 2003
INVENTOR(S) : Yoshitaka Sasaki et al.

It is certified that error appears in the above-identified patent and that said Letters Patent is hereby corrected as shown below:

<u>Column 3,</u>
Line 44, replace "pole-layer" with -- pole layer --.

<u>Column 8,</u>
Line 8, replace "thicknessess" with -- thickness is --.

<u>Column 9,</u>
Line 2, replace "or" with -- for --.

<u>Column 22,</u>
Line 45, replace "22" with -- 23 --.

Signed and Sealed this

Thirtieth Day of September, 2003

JAMES E. ROGAN
*Director of the United States Patent and Trademark Office*